(12) United States Patent
Chu

(10) Patent No.: US 9,668,261 B1
(45) Date of Patent: May 30, 2017

(54) METHOD AND APPARATUS FOR TRANSMITTING WIRELESS NETWORK OPERATIONAL INFORMATION

(71) Applicant: Marvell International Ltd., Hamilton (BM)

(72) Inventor: Liwen Chu, San Ramon, CA (US)

(73) Assignee: Marvell International Ltd., Hamilton (BM)

(*) Notice: Subject to any disclaimer, the term of this patent is extended or adjusted under 35 U.S.C. 154(b) by 207 days.

(21) Appl. No.: 14/579,703

(22) Filed: Dec. 22, 2014

Related U.S. Application Data

(60) Provisional application No. 61/920,979, filed on Dec. 26, 2013.

(51) Int. Cl.
| | | |
|---|---|---|
| *H04J 3/24* | (2006.01) | |
| *H04L 12/805* | (2013.01) | |
| *H04L 29/06* | (2006.01) | |
| *H04W 28/06* | (2009.01) | |
| *H04W 72/04* | (2009.01) | |
| *H04B 7/0413* | (2017.01) | |

(Continued)

(52) U.S. Cl.
CPC ........ *H04W 72/046* (2013.01); *H04B 7/0413* (2013.01); *H04L 1/0606* (2013.01); *H04L 1/0612* (2013.01); *H04W 84/12* (2013.01)

(58) Field of Classification Search
CPC ... H04L 5/0003; H04L 5/0058; H04L 47/365; H04L 47/38; H04L 47/58; H04L 69/166; H04W 28/065; H04W 80/06; H04W 84/12; H04B 7/0413
See application file for complete search history.

(56) References Cited

U.S. PATENT DOCUMENTS

| | | | |
|---|---|---|---|
| 7,710,939 B2 * | 5/2010 | Shao | H04W 52/0225 370/311 |
| 8,144,647 B2 | 3/2012 | Nabar et al. | |

(Continued)

FOREIGN PATENT DOCUMENTS

WO    WO-2012/122119 A1    9/2012

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

(Continued)

*Primary Examiner* — Alpus H Hsu

(57) ABSTRACT

A communication device generates an informational element (IE) to include an indication of a minimum modulation and coding scheme (MCS) allowable in a wireless communication network. The minimum MCS is from an ordered set of multiple MCSs defined by a communication protocol utilized by the wireless communication network. The indication of the minimum MCS also indicates use of any MCSs below the minimum MCS in the ordered set of MCSs is not allowed in the wireless communication network. The communication device generates a data unit that includes the IE.

18 Claims, 7 Drawing Sheets

(51) Int. Cl.
*H04L 1/06* (2006.01)
*H04W 84/12* (2009.01)

(56) References Cited

U.S. PATENT DOCUMENTS

| | | | | |
|---|---|---|---|---|
| 8,170,606 B2* | 5/2012 | Dorsey | H04B 1/036 370/311 |
| 8,244,296 B2* | 8/2012 | Dorsey | H04B 1/036 370/311 |
| 8,289,952 B2* | 10/2012 | Larsson | H04L 1/0003 370/328 |
| 8,346,299 B2* | 1/2013 | Dorsey | H04B 1/036 370/311 |
| 8,554,261 B2* | 10/2013 | Niu | H04L 1/0003 455/25 |
| 8,611,288 B1* | 12/2013 | Zhang | H04B 7/0619 370/235 |
| 8,619,814 B2* | 12/2013 | Seok | H04W 80/02 370/329 |
| 8,665,949 B1* | 3/2014 | Zhang | H04L 27/2627 370/535 |
| 8,699,340 B2* | 4/2014 | Fantaye | H04L 1/0003 370/232 |
| 8,761,108 B2* | 6/2014 | Ren | H04L 1/0003 370/329 |
| 8,767,854 B2* | 7/2014 | Zheng | H04L 27/2626 370/203 |
| 8,787,341 B2* | 7/2014 | Sohn | H04L 1/0025 370/241 |
| 8,885,495 B1* | 11/2014 | Liu | H04B 7/0617 370/252 |
| 2006/0187964 A1* | 8/2006 | Li | H04W 74/002 370/474 |
| 2009/0196163 A1 | 8/2009 | Du | |
| 2010/0260114 A1* | 10/2010 | Vermani | H04L 1/1854 370/329 |
| 2010/0271963 A1* | 10/2010 | Koorapaty | H04L 1/0003 370/252 |
| 2011/0194419 A1* | 8/2011 | Lee | H04H 20/423 370/242 |
| 2011/0261783 A1* | 10/2011 | Mo | H04W 28/06 370/330 |
| 2012/0195391 A1 | 8/2012 | Zhang et al. | |
| 2012/0201316 A1 | 8/2012 | Zhang et al. | |
| 2012/0294294 A1 | 11/2012 | Zhang | |
| 2012/0300874 A1 | 11/2012 | Zhang | |
| 2013/0010896 A1* | 1/2013 | Jiao | H04B 7/0417 375/296 |
| 2013/0202001 A1 | 8/2013 | Zhang | |
| 2013/0286961 A1* | 10/2013 | Vermani | H04L 1/0003 370/329 |
| 2014/0269659 A1* | 9/2014 | Wentink | H04W 28/065 370/338 |
| 2016/0226623 A1* | 8/2016 | Froberg Olsson | H04L 1/0023 |

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. Jan. 2695 (Mar. 29, 2012).

IEEE STD 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

Lee et al., "TGaf PHY proposal," *The Institute of Electrical and Electronics Engineers*, doc. No. IEEE 802.11-12/0809r5, pp. 1-43, Jul. 10, 2012.

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

Yu et al., "Coverage extension for IEEE802.11ah," *The Institute of Electrical and Electronics Engineers*, doc. No. IEEE 802.11-11/0035r1, pp. 1-10 (Jan. 2011).

Taghavi et al., "Introductory Submission for TGah", doc. No. IEEE 802.11-11/0062r0, *Institute for Electrical and Electronics Engineers*, pp. 1-5 (Jan. 14, 2011).

de Vegt, "Potential Compromise for 802.11ah Use Case Document", Institute of Electrical and Electronics Engineers, doc. No. IEEE 802.11-11/0457r0, pp. 1-27 (Mar. 2011).

Zhang et al., "11ah Data Transmission Flow," *The Institute of Electrical and Electronics Engineers*, doc. No. IEEE 802.11-11/1484r1, pp. 1-15 (Nov. 2011).

Park, "Proposed Specification Framework for TGah", *The Institute of Electrical and Electronics Engineers*, doc. No. IEEE 802.11-11/1137r6, pp. 1-13 (Mar. 2012).

Park, "Proposed Specification Framework for TGah D9.x", *The Institute of Electrical and Electronics Engineers*, doc. No. IEEE 802.11-yy/xxxxr0, pp. 1-30 (Jul. 2012).

Vermani, et al. "Preamble Format for 1 MHz," *The Institute of Electrical and Electronics Engineers*, doc. No. IEEE 802.11-11/1482r2, pp. 1-30 (Nov. 2011).

Zhang et al., "1 MHz Waveform in Wider BW", *The Institute of Electrical and Electronics Engineers*, doc. No. IEEE 802.11-12/0309r1, pp. 1-10 (Mar. 2012).

Vermani, et al. "Spec Framework Text for PHY Numerology," *The Institute of Electrical and Electronics Engineers*, doc. No. IEEE 802.11-11/13111-0, pp. 1-5 (Sep. 2011).

Park, "Proposed Specification Framework for TGah", *The Institute of Electrical and Electronics Engineers*, doc. No. IEEE 802.11-11/1137r11, pp. 1-36 (Sep. 2012).

Park, "Specification Framework for TGah," *The Institute of Electrical and Electronics Engineers*, doc. No. IEEE 802.11-11/1137r13, pp. 1-58 (Jan. 14, 2013).

Zhang et al., "Beamforming Feedback for Single Stream," *The Institute of Electrical and Electronics Engineers*, doc. No. IEEE 802.11-12/1312r0, pp. 1-22 (Nov. 12, 2012).

Shao, "Channel Selection for 802.11ah," doc.: IEEE 802.11-12/0816r0, pp. 1-11 (Jul. 2012).

Park, "Proposed Specification Framework for TGah", *The Institute of Electrical and Electronics Engineers*, doc. No. IEEE 802.11--yy/xxxxr05, (Jan. 2012).

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-91 (Sep. 1999).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11b-1999/Cor 1-2001 (Corrigendum to IEEE Std 802.11b-1999) "IEEE Standard for Information technology—Tele-

(56) References Cited

OTHER PUBLICATIONS communications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," The Institute of Electrical and Electronics Engineers, Inc., pp. 1-23 (Nov. 7, 2001).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

\* cited by examiner

| Element ID 304 | Length 308 | S1G Operational Information 312 | Basic S1G-MCS and N$_{SS}$ Set 316 |
|---|---|---|---|

Octets:　　　1　　　　1　　　　　4　　　　　　　4

| Operating Channel and 1 MHz Restriction 320 | Operating Class 324 | Primary Channel Number 328 |
|---|---|---|

Octets:　　　　1　　　　　　　　2　　　　　　　1

| Field | Description | Encoding |
|---|---|---|
| Operating Channel and 1 MHz Restriction 320 | This field defines the BSS operating channel width (see 10.39.1 (Basic S1G BSS functionality)), primary channel position and 1MHz transmission restriction. | Bitmap of B0-B2 indicates the operating channel widths, 1/2/4/8/16MHz.<br>B2, B1, B0 are set to 000 when the BSS operation Bandwidth is 1MHz,<br>B2, B1, B0 are set to 001 when the BSS operation Bandwidth is 2MHz,<br>B2, B1, B0 are set to 010 when the BSS operation Bandwidth is 4MHz,<br>B2, B1, B0 are set to 011 when the BSS operation Bandwidth is 8MHz,<br>B2, B1, B0 are set to 100 when the BSS operation Bandwidth is 16MHz,<br>101 to 111 of B2, B1, B0 are reserved.<br><br>B3 bits indicates the location of 1MHz transmission in a BSS with >=2MHz operation channel width. This bit is reserved when the BSS Operation Channel is 1MHz<br>-B3 is set to 0 to indicate a lower side of 2MHz primary channel.<br>-B3 is set to 1 to indicate a upper side of 2MHz primary channel.<br><br>Bitmap of B6-B4 indicates the position of 2MHz primary channel where B6,B5,B4=000 indicates the lowest 2MHz of the BSS operating channel and B6,B5,B4=111 indicates the highest 2Mhz of the BSS operating channel of 16MHz. These bits are reserved when the BSS Operation Channel is 1MHz.<br><br>B7 being 1 means only a single spatial stream PPDU can be used at 1MHz channel width. B7 being 0 means that the 1MHz spatial stream can be same as other bandwidth. |
| Operating Class 324 | This field defines the oprating class that the BSS is operating in | Operating Class encoding. |
| Primary Channel Number 328 | Primary Channel Number field indicates the channel number of 2 MHz primary channel. | Primary Channel Number encoding. |

*FIG. 3D* ← 316

| Minimum S1G-MCS for 1 SS | Maximum S1G-MCS for 1 SS | Minimum S1G-MCS for 2 SS | Maximum S1G-MCS for 2 SS | Minimum S1G-MCS for 3 SS | Maximum S1G-MCS for 3 SS | Minimum S1G-MCS for 4 SS | Maximum S1G-MCS for 4 SS |
|---|---|---|---|---|---|---|---|
| 2 | 2 | 2 | 2 | 2 | 2 | 2 | 2 |

Bits:

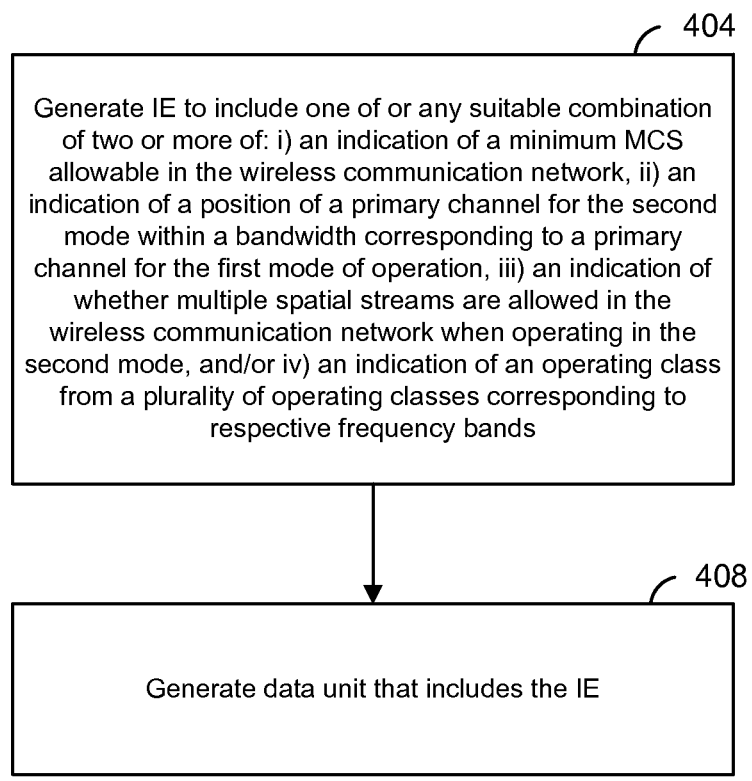

METHOD AND APPARATUS FOR TRANSMITTING WIRELESS NETWORK OPERATIONAL INFORMATION

CROSS-REFERENCE TO RELATED APPLICATION

This disclosure claims the benefit of U.S. Provisional Patent Application No. 61/920,979, filed Dec. 26, 2013, entitled "S1G Operation Element," which is hereby expressly incorporated herein by reference in its entirety.

FIELD OF THE DISCLOSURE

The present disclosure relates generally to wireless communication networks, and describes embodiments in which an access point (AP) disseminates operational information in a wireless local area network (WLAN).

BACKGROUND

Wireless local area network (WLAN) technology has evolved rapidly over the past decade. Development of WLAN standards such as the Institute for Electrical and Electronics Engineers (IEEE) 802.11a, 802.11b, 802.11g, 802.11n, 802.11ac Standards has improved single-user peak data throughput. For example, the IEEE 802.11b Standard specifies a single-user peak throughput of 11 megabits per second (Mbps); the IEEE 802.11a and 802.11g Standards specify a single-user peak throughput of 54 Mbps; the IEEE 802.11n Standard specifies a single-user peak throughput of 600 Mbps; and the IEEE 802.11ac Standard specifies a single-user peak throughput of 6.77 gigabits per second (Gbps). Work has begun on a new standard, IEEE 802.11ax, that promises to provide even greater throughput.

Additionally, work has begun on a two other new standards, IEEE 802.11ah and IEEE 802.11af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In an embodiment, a method for communicating wireless network operational information includes generating, at a communication device, an informational element (IE) to include an indication of a minimum modulation and coding scheme (MCS) allowable in a wireless communication network, wherein the minimum MCS is from an ordered set of multiple MCSs defined by a communication protocol utilized by the wireless communication network, and the indication of the minimum MCS also indicates use of any MCSs below the minimum MCS in the ordered set of MCSs is not allowed in the wireless communication network. The method also includes generating, at the communication device, a data unit that includes the IE.

In another embodiment, an apparatus comprises a network interface having one or more integrated circuits configured to generate an IE to include an indication of a minimum MCS allowable in a wireless communication network, wherein the minimum MCS is from an ordered set of multiple MCSs defined by a communication protocol utilized by the wireless communication network, and the indication of the minimum MCS also indicates use of any MCSs below the minimum MCS in the ordered set of MCSs is not allowed in the wireless communication network. The one or more integrated circuits are also configured to generate a data unit that includes the IE.

In yet another embodiment, a tangible, non-transitory computer readable medium or media storing machine readable instructions that, when executed by one or more processors, cause the one or more processors to: generate an IE to include an indication of a minimum MCS allowable in a wireless communication network, wherein the minimum MCS is from an ordered set of multiple MCSs defined by a communication protocol utilized by the wireless communication network, and the indication of the minimum MCS also indicates use of any MCSs below the minimum MCS in the ordered set of MCSs is not allowed in the wireless communication network; and generate a data unit that includes the IE.

BRIEF DESCRIPTION OF THE DRAWINGS

FIGS. 3A-D illustrate an example information element (IE) utilized by an access point to communicate wireless network operational information to stations in a WLAN, according to an embodiment.

FIG. 4 is a flow diagram of an example method for communicating wireless network operational information in a wireless communication network, according to an embodiment.

DETAILED DESCRIPTION

Figure 1:
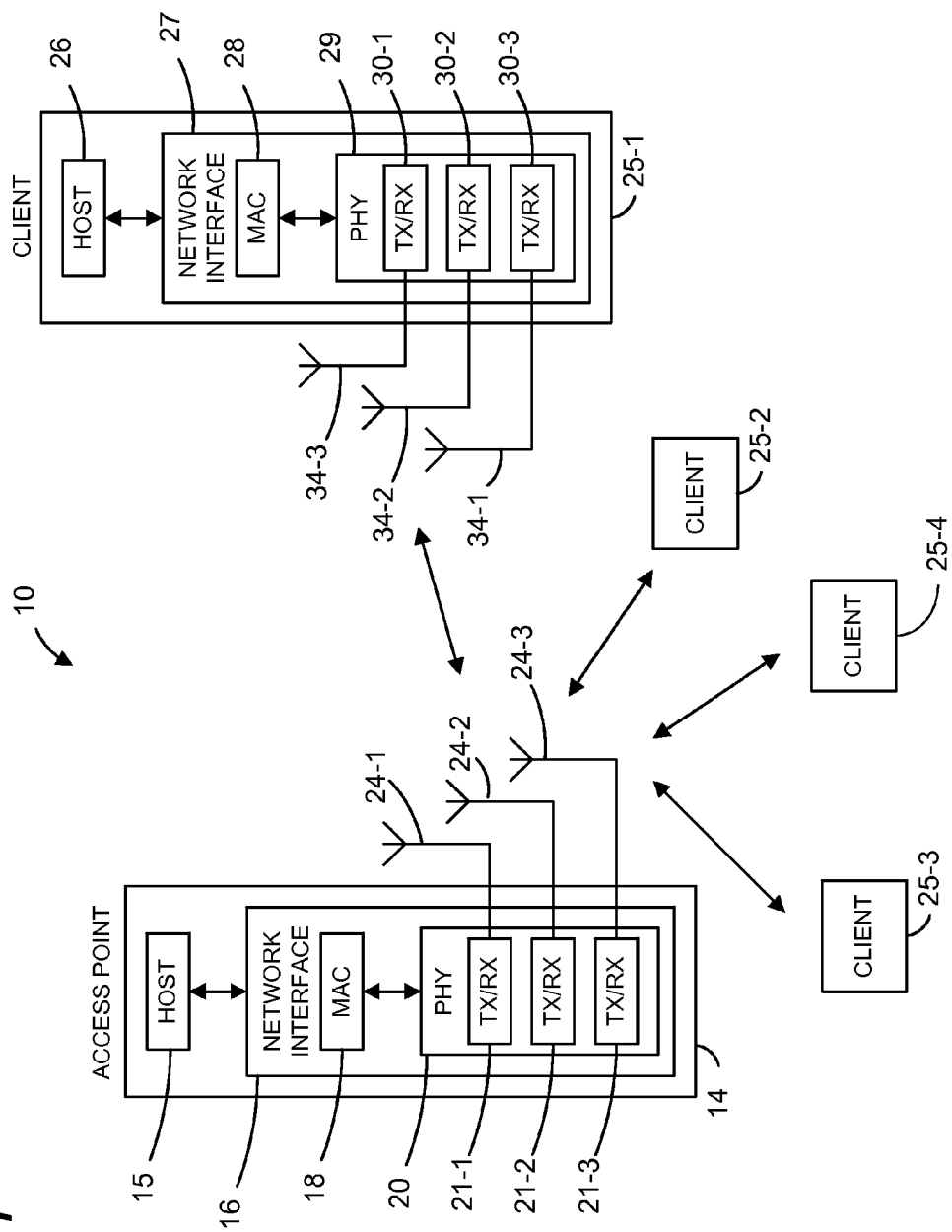
FIG. 1 a block diagram of an example wireless local area network (WLAN) in which an access point communicates wireless network operational information to stations in the WLAN, according to an embodiment.

In embodiments described below, a wireless network device such as an access point (AP) of a wireless local area network (WLAN) transmits data streams to one or more client stations. The AP is configured to operate with client stations according to at least a first communication protocol. In some embodiments, the first communication protocol defines at least two modes of operation including: i) a first mode having a first minimum channel bandwidth, and ii) a second mode having a second minimum channel bandwidth that is a fraction of the first minimum channel bandwidth. As merely an illustrative example, the first minimum channel bandwidth is 2 MHz and the second minimum channel bandwidth is 1 MHz. In other embodiments, other suitable bandwidths and/or fractions are utilized, for example corresponding to first minimum bandwidth and second minimum bandwidth pairs such as 1 MHz/0.5 MHz, 2.5 MHz/ 1.25 MHz, 3 MHz/1 MHz, 5 MHz/2 MHz, 10 MHz/5 M Hz, etc. In some embodiments, the second mode also is configured to provide longer range operation than the first mode. In other embodiments, however, the first communication protocol does not define different modes with different minimum bandwidths.

In some embodiments, the first communication protocol defines operation in a sub-1 GHz frequency range, and is typically used for applications requiring long range wireless communication with relatively low data rates. In some embodiments, however, the first communication protocol does not defines operation in any sub-1 GHz frequency ranges, and/or is not necessarily used for applications requiring long range wireless communication with relatively low data rates. In some embodiments, the first communication protocol defines operation above 1 GHz. In some embodiments, the first communication protocol is a protocol such as defined by the IEEE 802.11 of Standard or the IEEE 802.11 ah Standard. In other embodiments, the first communication protocol is another suitable wireless communication protocol.

In some embodiments, the AP is also configured to communicate with client stations according to one or more second communication protocols which define operation in generally higher frequency ranges and are typically used for closer-range communications with higher data rates as compared to the first communication protocol. In some embodiments, the one or more second communication protocols are protocols such as defined by the IEEE 802.11a Standard, IEEE 802.11g Standard, the IEEE 802.11n Standard, the IEEE 802.11ac Standard, etc. In other embodiments, however, the one or more second communication protocols are other suitable wireless communication protocols. In some embodiments, the AP is not configured to communicate according to the second communication protocol.

In some embodiments, a first communication device (e.g., an AP or other suitable communication device) is configured to disseminate operational information regarding a wireless communication network (e.g., a WLAN or another suitable wireless communication network) to other second communication devices in the wireless communication network. In various embodiments, the first communication device generates one or more data units that include one or more information elements (IEs). The one or more IEs include the operational information, according to some embodiments.

In various embodiments, the operational information includes one of, or any suitable combination of two or more of: i) a minimum modulation and coding scheme (MCS) that is allowed in the wireless communication network, ii) respective indications of respective minimum MCSs allowable in the wireless communication network for corresponding different numbers of spatial streams, iii) a position, within a first primary channel for use in the first mode of operation, of a second primary channel for use in the second mode of operation, iv) an indication of whether multiple spatial streams are allowed in the wireless communication network in the second mode of operation, v) an indication of an operating class from a plurality of operating classes corresponding to respective frequency bands, etc.

In some embodiments, the second mode is utilized for various suitable functions. For example, in an illustrative embodiment, the second mode is utilized for sending control-related messages such as beacons, association messages, exchanging of physical layer (PHY) parameters, transmit beamforming training operations, channel estimation operations, etc. In another illustrative embodiment, the second mode is utilized for communicating higher level protocol layer data such as Internet Protocol (IP) layer data, transport control protocol (TCP) layer data, application layer data, etc., over longer ranges than is possible in the first mode.

In some embodiments, the function of the second mode depends on the region in which the second mode is utilized. For example, in one embodiment of an IEEE 802.11ah system in the United States, where a relatively large amount of spectrum is available in sub-1 GHz frequencies, first mode communications utilize channels having a first minimum bandwidth (e.g., 2 MHz, 2.5 MHz, etc.), and the second mode has smaller second minimum bandwidth (e.g., 1 MHz, or 1.25 MHz, etc.). In some embodiments, the AP uses the second mode for signal beacon or association procedures, and/or for transmit beamforming training operations, for example. As another example, in one embodiment of a communication system in which less spectrum is available in sub-1 GHz frequencies (e.g., Europe or Japan), the second mode serves to provide longer ranges as compared to the first mode.

Illustrative examples and embodiments are discussed below in the context of a WLAN. In other embodiments, methods and apparatuses disclosed herein can be utilized with other suitable types of wireless communication networks such as personal area networks (PANs), wide area networks (WANs), metropolitan area networks (MANs), etc.

FIG. 1 is a block diagram of an example WLAN 10 including an AP 14, according to an embodiment. The AP 14 includes a host processor 15 coupled to a network interface device 16. The network interface device 16 includes a medium access control (MAC) processing unit 18 and a physical layer (PHY) processing unit 20. In an embodiment the MAC processing unit 18 is configured to perform MAC layer protocol functions. In an embodiment, the PHY processing unit 20 is configured to perform PHY functions.

The PHY processing unit 20 includes one or more transceivers 21, and the transceivers 21 are coupled to one or more antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. The number of antennas 24 need not be the same as the number of transceivers 21. In some embodiments, multiple transceivers 21 are coupled to the same antenna. In some embodiments, there are more antennas 24 than transceivers 21 and antenna switching techniques are utilized. Additionally, in some embodiments, the network interface 16 is configured to utilize antenna diversity, antenna beamforming, and/or a MIMO technique such as spatial multiplexing.

The WLAN 10 further includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 (e.g., client station 25-4) is configured to operate at least according to the second communication protocol. In other embodiments, however, no client stations are configured to operate according to the second communication protocol.

The client station 25-1 includes a host processor 26 coupled to a network interface 27. The network interface 27 includes a MAC processing unit 28 and a PHY processing unit 29. In an embodiment the MAC processing unit 28 is configured to perform MAC layer protocol functions. In an embodiment, the PHY processing unit 29 is configured to perform PHY functions.

The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments. The number of antennas 34 need not be the same as the number of transceivers 30. In some embodiments, multiple transceivers 30 are coupled to the same antenna. In some embodiments, there are more antennas 34 than transceivers 30 and antenna switching techniques are utilized. Additionally, in some embodiments, the network interface 27 is configured to utilize antenna diversity, antenna beamforming, and/or a MIMO technique such as spatial multiplexing.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol and having formats described hereinafter. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is also configured to process received data units conforming to the first communication protocol and having formats described hereinafter, according to various embodiments.

In various embodiments, the PHY processing unit 29 of the client device 25-1 is configured to generate data units conforming to the first communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is also configured to process received data units conforming to the first communication protocol and having formats described hereinafter, according to various embodiments.

In some embodiments, the AP 14 is configured to operate in dual frequency band configurations. In such embodiments, the AP 14 is able to switch between using the first communication protocol and the second communication protocol. Similarly, the client station 25-1 is capable of dual frequency band operation, according to some embodiments. In these embodiments, the client station 25-1 is able to switch between using the first communication protocol and the second communication protocol. In other embodiments, the AP 14 and/or the client station 25-1 is a single band device configured to utilize only the first communication protocol.

In some embodiments, the first communication protocol defines a plurality of MCSs for use in wireless communication networks. In some embodiments, each MCS provides a different data rate for a given set of one or more other parameters, e.g., length of guard interval utilized, number of spatial streams utilized, etc. Thus, in some embodiments, the MCSs can be ordered based on throughput to provide an ordered set of MCSs. In some embodiments, as MCSs decrease in the order, robustness increases (e.g., a lower MCS provides better performance in the presence of noise, interference, etc., as compared to a higher MCS). In some embodiments, as MCSs decrease in the order, range increases (e.g., a lower MCS provides a longer range as compared to a higher MCS). Thus, in some embodiments, the MCSs can be ordered based on, for example, robustness, range, etc.

In some embodiments, the AP 14 is configured to set a minimum MCS for the WLAN 10 such that any MCSs below the minimum MCS in the ordered set of MCSs are not allowed in the WLAN 10. Additionally, the AP 14 is configured to transmit an indication of the minimum MCS for the WLAN 10 to the stations 25. In some embodiments, the AP 14 is configured to set respective minimum MCSs for the WLAN 10 for different numbers of spatial streams. Additionally, the AP 14 is configured to transmit respective indications of the minimum MCSs for different numbers of spatial streams for the WLAN 10 to the stations 25. In some embodiments, the AP 14 is configured to generate an information element (IE) that includes operational information comprising the indication(s) of the minimum MCS(s). In some embodiments, the AP 14 is configured to generate a data unit (e.g., a MAC layer data unit, a PHY data unit, etc.) that includes the IE. In various embodiments, the data unit is a beacon data unit, an association response data unit, a probe response data unit, etc.

Upon receiving the indication(s) of the minimum MCS(s), the stations 25 refrain from using any MCSs below the indicated minimum MCS(s) (at least for the certain numbers of spatial streams, in some embodiments), according to an embodiment. In some embodiments in which different MCSs provide different ranges, setting the minimum MCS(s) above an absolute minimum MCS defined by the first communication protocol has an effect of reducing the range of the network 10 as compared to the network 10 using MCSs below the indicated minimum MCS(s). By reducing the range of networks in this manner, more networks can be located within a given spatial (e.g., geographic) area, at least in some embodiments.

Figure 2A:
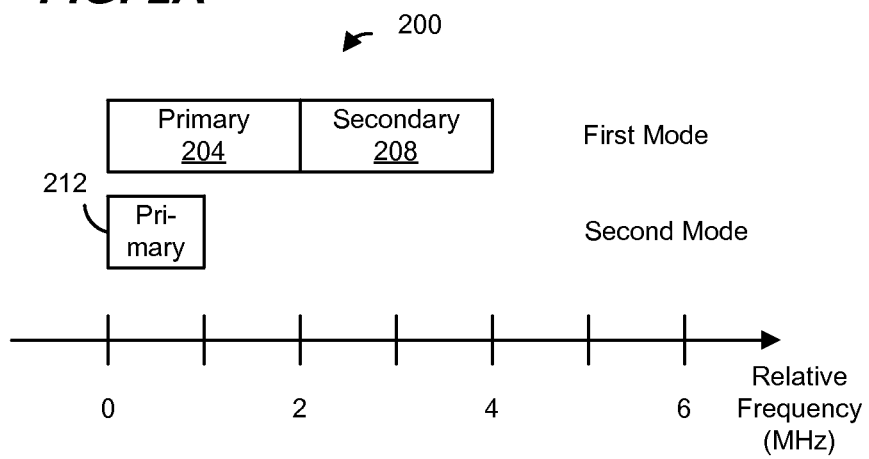
FIGS. 2A and 2B are diagrams illustrating example placement, within a bandwidth corresponding to a primary channel used in a first mode of operation, of a narrow bandwidth primary channel used in a second mode of operation, according to an embodiment.

In some embodiments in which a first mode and a second mode are utilized such as described above, the AP 14 is configured to set a location (in frequency) of a narrower primary channel for the second mode of operation within a primary channel for the first mode of operation. FIG. 2A is a diagram of an illustrative example of a composite channel 200 that is utilized in the network 10, according to an illustrative embodiment. The composite channel 200 is utilized in the first mode in which a smallest channel unit of width is 2 MHz (as merely an illustrative example). The composite channel 200 includes a primary channel 204 and a secondary channel 208.

A primary channel 212 is utilized in the second mode of operation in which the smallest channel unit of width is 1 MHz (as merely an illustrative example). In the example of FIG. 2A, the primary channel 212 is located in a lower half of the bandwidth of the primary channel 204. On the other hand, in the example of FIG. 2B, the primary channel 212 is located in an upper half of the bandwidth of the primary channel 204.

Thus, in some embodiments, the AP 14 is configured to transmit an indication of the location (in frequency) of the primary channel 212 within the bandwidth corresponding to the primary channel 204 for the WLAN 10 to the stations 25. In some embodiments, the AP 14 is configured to generate an IE that includes operational information comprising the indication of the location of the primary channel 212 within the bandwidth corresponding to the primary channel 204. In some embodiments, the IE that includes the indication of the location of the primary channel 212 within the bandwidth corresponding to the primary channel 204 also includes the indication(s) of the minimum MCS(s), as discussed above. In some embodiments, the AP 14 is configured to generate a data unit (e.g., a MAC layer data unit, a PHY data unit, etc.) that includes the IE. In various embodiments, the data unit is, or includes, a beacon data unit, an association response data unit, a probe response data unit, etc.

Upon receiving the indication of the location of the primary channel 212 within the bandwidth corresponding to the primary channel 204, the network interfaces 27 of the stations 25 configure themselves to utilize the appropriate primary channel 212 when operating the second mode, according to an embodiment. In some embodiments, this technique facilitates permitting different locations of the primary channel 212 within the bandwidth of the primary channel 204. This may help to reduce interference with another WLAN that is proximate to the WLAN 10, at least in some embodiments. For example, in some embodiments, when the other WLAN is also using bandwidth corresponding to the primary channel 204 as its primary channel and is capable of operating in the second mode, the AP 14 can determine bandwidth within the primary channel 204 that the other WLAN is using for its second mode primary channel, and then select a location of the primary channel 212 that is different than that used by the other WLAN. As another example, in some embodiments, when the other WLAN is also using bandwidth corresponding to the primary channel 204 as its primary channel and is capable of operating in the second mode, the AP 14 can determine bandwidth within the primary channel 204 that the other WLAN is using for its second mode primary channel, and then select a location of the primary channel 212 that is the same as that used by the other WLAN.

Figure 2B:
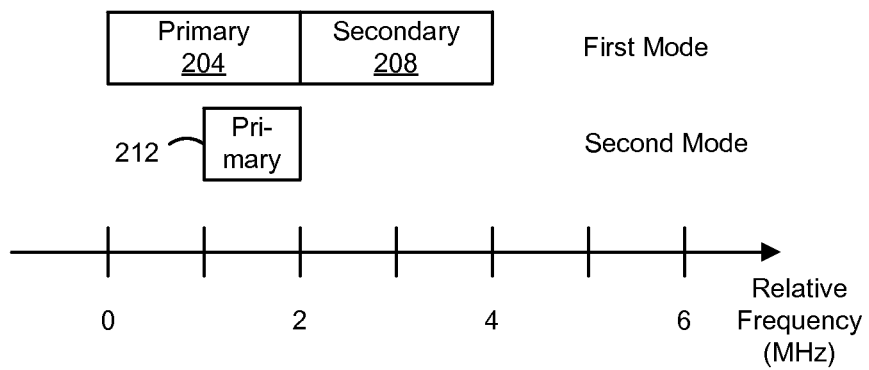

Although FIGS. 2A and 2B were discussed with respect to specific bandwidths of the primary channel 204 and the primary channel 212, other suitable bandwidths are utilized in other embodiments. Additionally, although FIGS. 2A and 2B were discussed with respect to the bandwidth of the primary channel 212 being one half the bandwidth of the primary channel 204, the bandwidth of the primary channel 212 is another suitable fraction (e.g., one third, one quarter, one fifth, etc.) of the bandwidth of the primary channel 204, in other embodiments. Thus, in some embodiments, there are more than two possible locations of the primary channel 212 within the bandwidth of the primary channel 204 (e.g., three locations (e.g., upper third, middle third, lower third), four locations, five locations, etc.).

In some embodiments, the AP 14 is configured to set an operating class of the WLAN 10, where the operating class corresponds to a particular frequency spectrum. In some embodiments, the operating class is indicated by a starting frequency, and a channel spacing. In some embodiments, the operating class also corresponds to a set of channels. In other embodiments, the operating class is indicated additionally or alternatively using other suitable parameters such as i) a starting frequency and an ending frequency, ii) a starting frequency and a bandwidth, etc. In some embodiments, the AP 14 is configured to generate an IE that includes operational information comprising an indication of the operating class. In some embodiments, the IE that includes the indication of the operating class also includes one or both of i) the indication(s) of the minimum MCS(s) (as discussed above), and/or ii) the location of the primary channel 212 within the bandwidth corresponding to the primary channel 204 also includes the indication(s) of the minimum MCS(s) (as discussed above). In some embodiments, the AP 14 is configured to generate a data unit (e.g., a MAC layer data unit, a PHY data unit, etc.) that includes the IE. In various embodiments, the data unit is, or includes, a beacon data unit, an association response data unit, a probe response data unit, etc.

Upon receiving the indication of the operating class, the network interfaces 27 of the stations 25 configure themselves to operate in the operating class, according to an embodiment. In some embodiments, the indication of the operating class includes a starting frequency and a channel spacing. In some embodiments, the indication of the operating class also includes an indication of a set of channels. In other embodiments, the indication of the operating class additionally or alternatively includes other suitable parameters such as i) a starting frequency and an ending frequency, ii) a starting frequency and a bandwidth, etc.

In some embodiments, the AP 14 is configured to set whether more than one spatial stream can be utilized in the WLAN 10 in the second mode. In some embodiments, the AP 14 is configured to generate an IE that includes operational information comprising an indication of whether more than one spatial stream can be utilized in the WLAN 10 in the second mode. In some embodiments, the IE that includes the indication of whether more than one spatial stream can be utilized in the WLAN 10 in the second mode, also includes any one of, any two of, or all of i) the indication(s) of the minimum MCS(s) (as discussed above), ii) the location of the primary channel 212 within the bandwidth corresponding to the primary channel 204 also includes the indication(s) of the minimum MCS(s) (as discussed above), and/or iii) the indication of the operating class. In some embodiments, the AP 14 is configured to generate a data unit (e.g., a MAC layer data unit, a PHY data unit, etc.) that includes the IE. In various embodiments, the data unit is, or includes, a beacon data unit, an association response data unit, a probe response data unit, etc.

Upon receiving the indication that more than one spatial stream cannot be utilized in the WLAN 10 in the second mode, the network interfaces 27 of the stations 25 configure themselves to not use more than one spatial stream in the WLAN 10 in the second mode.

FIGS. 3A-D are diagrams of an example IE 300 that includes operational information such as described above, according to an illustrative embodiment. In other embodiments, one or more other suitable IEs are utilized.

Referring now to FIG. 3A, the IE 300 includes an element identifier 304, a length field 308 to indicate a length of the IE 300, a sub-1 Gigahertz (S1G) operational information field 312, and a basic S1G-MCS and Nss Set field 316. Example lengths of fields of the IE 300 are illustrated in FIG. 3A. In other embodiments, other suitable lengths are utilized. The fields 312 and 316 are described in more detail with reference to FIGS. 3B-D.

For example, FIG. 3B illustrates the field 312, according to an illustrative embodiment, in more detail. The field 312 includes three subfields 320, 324, and 328. The subfield 320 provides information regarding the width of a channel that is to be utilized in the WLAN 10. For example, if channel bonding is utilized, multiple unit channels can be utilized to form a composite channel having a bandwidth equal to an integer multiple of a unit channel bandwidth, in some embodiments. The subfield 320 also provides information regarding position of a primary channel utilized in the second mode within a bandwidth corresponding to a primary channel utilized in the first mode, as discussed above. The subfield 320 also provides an indication of whether multiple spatial streams can be utilized when operating in the second mode. The subfield 320 is described in more detail with reference to FIG. 3C.

The subfield 324 provides an indication of an operating class utilized by the WLAN 10. The subfield 328 provides an indication of the primary channel utilized by the WLAN 10 in the first mode.

FIG. 3C is a table 340 describing the field 312 in more detail, according to an illustrative embodiment. For example, bits B0-B2 of subfield 320 are utilized to indicate whether the channel to be utilized has a bandwidth of 1 MHz, 2 MHz, 4 MHz, 8 MHz, or 16 MHz. Bit B3 of subfield 320 is utilized to indicate a position of the primary channel in the second mode within the bandwidth of the primary channel of the first mode. Bits B4-B6 of subfield 320 are utilized to indicate a position of the primary channel in the first mode within the bandwidth of the overall channel.

The subfield 324 is encoded in a suitable manner to indicate the operating class. In some embodiments, the subfield 324 is encoded to indicate a starting frequency and a channel spacing corresponding to an operating class. In some embodiments, the subfield 324 is encoded to also indicate a set of channels corresponding to the operating class. In other embodiments, the subfield 324 is encoded to additionally or alternatively indicate other suitable parameters such as i) a starting frequency and an ending frequency, ii) a starting frequency and a bandwidth, etc.

The subfield 328 is encoded in a suitable manner to indicate a channel number corresponding to the primary channel in the first mode. For example, the subfield 328 is encoded to indicate a channel identifier such as a channel number or other suitable identifier, according to some embodiments. [

Referring now to FIG. 3D, an example embodiment of the field 316 of the IE 300 is illustrated. The field 316 includes four subfields that indicate a respective minimum MCS for when one spatial stream is utilize, when two spatial streams are utilized, when three spatial streams are utilized, and when four spatial streams are utilized. Similarly, in an embodiment, the field 316 includes four subfields that indicate a respective maximum MCS for when one spatial stream is utilized, when two spatial streams are utilized, when three spatial streams are utilized, and when four spatial streams are utilized.

FIG. 4 is a flow diagram of an example method 400 for communicating wireless network operational information in a wireless communication network, according to an embodiment. In an embodiment, the method 400 is implemented by an AP in the WLAN, according to an embodiment. With reference to FIG. 1, the method 400 is implemented by the AP 14. For example, the method 400 is implemented by the MAC processing unit 18, by the PHY processing unit 20 of the AP 14, and/or by the host processor 15, according to various embodiments. In other embodiments, the method 400 is implemented by other components of the AP 14, or is implemented by a suitable communication device other than the AP 14.

At block 404, an IE is generated to include one of or any suitable combination of two or more of: i) an indication of a minimum MCS allowable in the wireless communication network, ii) an indication of a position of a primary channel for the second mode within a bandwidth corresponding to a primary channel for the first mode of operation, iii) an indication of whether multiple spatial streams are allowed in the wireless communication network when operating in the second mode, and/or iv) an indication of an operating class from a plurality of operating classes corresponding to respective frequency bands.

If block 404 includes generating the IE to include the indication of the minimum MCS, the method also includes setting the minimum MCS, according to an embodiment. If block 404 includes generating the IE to include the indication of the position of the primary channel for the second mode within the bandwidth corresponding to the primary channel for the first mode of operation, the method also includes setting the position, according to an embodiment. If block 404 includes generating the IE to include the indication of whether multiple spatial streams are allowed in the wireless communication network when operating in the second mode, the method also includes setting whether multiple spatial streams are allowed in the wireless communication network when operating in the second mode, according to an embodiment. If block 404 includes generating the IE to include the indication of the operating class, the method also includes setting the operating class, according to an embodiment.

Figure 5A:
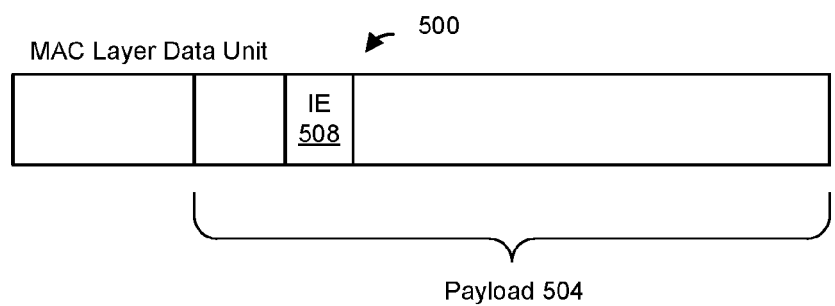
FIG. 5A is a diagram of an example media access control (MAC) layer data unit that includes an IE such as the IE of FIGS. 3A-D, according to an embodiment.
Figure 5B:
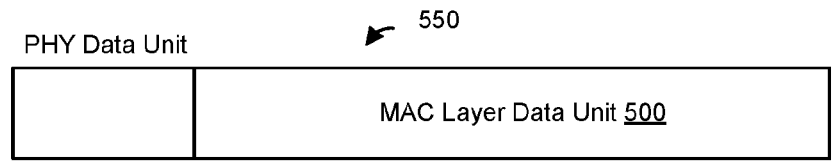
FIG. 5B is a diagram of an example physical layer (PHY) data unit that includes the MAC layer data unit of FIG. 5A, according to an embodiment.

At block 408, a data unit is generated to include the IE. In an embodiment, block 408 includes generating a MAC layer data unit that includes the IE. For example, in an embodiment, the MAC layer data unit is generated to include the IE in a payload of the MAC layer data unit. Referring now to FIG. 5A, a MAC layer data unit 500 includes a payload 504 having an IE 508 generated according to block 404 of FIG. 4. Referring again to FIG. 4, in an embodiment, block 408 includes generating a PHY data unit that includes the IE. For example, in an embodiment, the PHY data unit is generated to include the MAC layer data unit discussed above, which includes the IE. Referring now to FIG. 5B, a PHY data unit 550 includes the MAC layer data unit 500 of FIG. 5A.

Referring again to FIG. 4, in some embodiments, the method further includes transmitting the data unit generated at block 408. In some embodiments, method further includes initiating transmission of the data unit generated at block 408.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any non-transient, tangible computer readable medium or media such as a magnetic disk, an optical disk, a random access memory (RAM), a read-only memory (ROM), a flash memory, a magnetic tape, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating wireless network operational information, the method comprising:
generating, at a first communication device, an informational element (IE) to include an indication of a minimum modulation and coding scheme (MCS) allowable in a wireless communication network, wherein
the minimum MCS is from an ordered set of multiple MCSs defined by a communication protocol utilized by the wireless communication network; and
generating, at the communication device, a physical layer (PHY) protocol data unit that includes the IE, the PHY protocol data unit for transmission in the wireless communication network to one or more second communication devices, such that when the one or more second communication devices receive the PHY protocol data unit having the indication of the minimum MCS, the one or more second communication devices refrain from using any MCSs below the minimum MCS in the ordered set of MCSs.

2. The method of claim 1, wherein generating the IE includes generating the IE to include respective indications of respective minimum MCSs allowable in the wireless communication network for corresponding different numbers of spatial streams, wherein:
each minimum MCS is from the ordered set of multiple MCSs defined by the communication protocol, such that when the one or more second communication devices receive the PHY protocol data unit having the respective indications of respective minimum MCSs, the one or more second communication devices refrain from using any MCSs below the respective minimum MCS in the ordered set of MCSs when using the respective number of spatial streams.

3. The method of claim 2, wherein generating the IE includes generating the IE to include respective indications of respective maximum MCSs allowable in the wireless communication network for corresponding different numbers of spatial streams, wherein:
each maximum MCS is from the ordered set of multiple MCSs defined by the communication protocol, such that when the one or more second communication devices receive the PHY protocol data unit having the respective indications of respective maximum MCSs, the one or more second communication devices refrain from using any MCSs above the respective maximum MCS in the ordered set of MCSs when using the respective number of spatial streams.

4. The method of claim 1, wherein:
the communication protocol defines i) a first mode of operation in which a first primary channel utilized by the wireless communication network has a first bandwidth, and ii) a second mode of operation in which a second primary channel utilized by the wireless communication network has a second bandwidth that is a fraction of the first bandwidth; and
generating the IE includes generating the IE to include an indication of a position of the second primary channel within the primary channel for the second mode of operation.

5. The method of claim 1, wherein:
the communication protocol defines i) a first mode of operation in which a first primary channel utilized by the wireless communication network has a first bandwidth, and ii) a second mode of operation in which a second primary channel utilized by the wireless communication network has a second bandwidth that is a fraction of the first bandwidth; and
generating the IE includes generating the IE to include an indication of whether multiple spatial streams are allowed in the wireless communication network when using the second primary channel in the second mode of operation.

6. The method of claim 1, wherein generating the IE includes generating the IE to include an indication of an operating class from a plurality of operating classes corresponding to respective frequency bands.

7. An apparatus, comprising:
a network interface of a first communication device, the network interface having one or more integrated circuits, the network interface comprising:
a media access control (MAC) processing unit implemented on the one or more integrated circuits, the MAC processing unit configured to
generate an informational element (IE) to include an indication of a minimum modulation and coding scheme (MCS) allowable in a wireless communication network, wherein
the minimum MCS is from an ordered set of multiple MCSs defined by a communication protocol utilized by the wireless communication network, and
generate a MAC layer protocol data unit that includes the IE;
wherein the network interface further comprises:
a physical layer (PHY) processing unit coupled to the MAC processing unit, the PHY processing unit implemented on the one or more integrated circuits, the PHY processing unit being configured to generate a PHY protocol data unit that includes the MAC layer protocol data unit, the PHY protocol data unit for transmission in the wireless communication network to one or more second communication devices, such that when the one or more second communication devices receive the PHY protocol data unit having the indication of the minimum MCS, the one or more second communication devices refrain from using any MCSs below the minimum MCS in the ordered set of MCSs.

8. The apparatus of claim 7, wherein the MAC processing unit is configured to generate the IE to include respective indications of respective minimum MCSs allowable in the wireless communication network for corresponding different numbers of spatial streams, wherein:
each minimum MCS is from the ordered set of multiple MCSs defined by the communication protocol, such that when the one or more second communication devices receive the PHY protocol data unit having the respective indications of respective minimum MCSs, the one or more second communication devices refrain from using any MCSs below the respective minimum MCS in the ordered set of MCSs when using the respective number of spatial streams.

9. The apparatus of claim 8, wherein the MAC processing unit is configured to generate the IE to include respective indications of respective maximum MCSs allowable in the wireless communication network for corresponding different numbers of spatial streams, wherein:
each maximum MCS is from the ordered set of multiple MCSs defined by the communication protocol, such that when the one or more second communication devices receive the PHY protocol data unit having the respective indications of respective maximum MCSs, the one or more second communication devices refrain from using any MCSs above the respective maximum MCS in the ordered set of MCSs when using the respective number of spatial streams.

10. The apparatus of claim 7, wherein:
the communication protocol defines i) a first mode of operation in which a first primary channel utilized by the wireless communication network has a first bandwidth, and ii) a second mode of operation in which a second primary channel utilized by the wireless communication network has a second bandwidth that is a fraction of the first bandwidth; and
the MAC processing unit is configured to generate the IE to include an indication of a position of the second primary channel within the first primary channel for the second mode of operation.

11. The apparatus of claim 7, wherein:
the communication protocol defines i) a first mode of operation in which a first primary channel utilized by the wireless communication network has a first bandwidth, and ii) a second mode of operation in which a second primary channel utilized by the wireless communication network has a second bandwidth that is a fraction of the first bandwidth; and
the MAC processing unit is configured to generate the IE to include an indication of whether multiple spatial streams are allowed in the wireless communication network when using the second primary channel in the second mode of operation.

12. The apparatus of claim 7, wherein the MAC processing unit is configured to generate the IE to include an indication of an operating class from a plurality of operating classes corresponding to respective frequency bands.

13. A tangible, non-transitory computer readable medium, or media, storing machine readable instructions that, when executed by one or more processors of a first communication device, cause the one or more processors to:
generate an informational element (IE) to include an indication of a minimum modulation and coding scheme (MCS) allowable in a wireless communication network, wherein
the minimum MCS is from an ordered set of multiple MCSs defined by a communication protocol utilized by the wireless communication network; and
generate a media access control (MAC) protocol layer data unit that includes the IE, the MAC layer protocol data unit for inclusion in a physical layer (PHY) protocol data unit for transmission in the wireless communication network to one or more second communication devices, such that when the one or more second communication devices receive the PHY protocol data unit having the indication of the minimum MCS, the one or more second communication devices refrain from using any MCSs below the minimum MCS in the ordered set of MCSs.

14. The tangible, non-transitory computer readable medium, or media, of claim 13, further storing machine readable instructions that, when executed by the one or more processors, cause the one or more processors to:
generate the IE to include respective indications of respective minimum MCSs allowable in the wireless communication network for corresponding different numbers of spatial streams, wherein:
each minimum MCS is from the ordered set of multiple MCSs defined by the communication protocol, such that when the one or more second communication devices receive the PHY protocol data unit having the respective indications of respective minimum MCSs, the one or more second communication devices refrain from using any MCSs below the respective minimum MCS in the ordered set of MCSs when using the respective number of spatial streams.

15. The tangible, non-transitory computer readable medium, or media, of claim 14, further storing machine readable instructions that, when executed by the one or more processors, cause the one or more processors to:
generate the IE to include respective indications of respective maximum MCSs allowable in the wireless communication network for corresponding different numbers of spatial streams, wherein:
each maximum MCS is from the ordered set of multiple MCSs defined by the communication protocol, such that when the one or more second communication devices receive the PHY protocol data unit having the respective indications of respective maximum MCSs, the one or more second communication devices refrain from using any MCSs above the respective maximum MCS in the ordered set of MCSs when using the respective number of spatial streams.

16. The tangible, non-transitory computer readable medium, or media, of claim 13, wherein:
the communication protocol defines i) a first mode of operation in which a first primary channel utilized by the wireless communication network has a first bandwidth, and ii) a second mode of operation in which a second primary channel utilized by the wireless communication network has a second bandwidth that is a fraction of the first bandwidth; and
the computer readable medium or media further stores machine readable instructions that, when executed by the one or more processors, cause the one or more processors to generate the IE to include an indication of a position of the second primary channel within the first primary channel for the second mode of operation.

17. The tangible, non-transitory computer readable medium, or media, of claim 13, wherein:
the communication protocol defines i) a first mode of operation in which a first primary channel utilized by the wireless communication network has a first bandwidth, and ii) a second mode of operation in which a second primary channel utilized by the wireless communication network has a second bandwidth that is a fraction of the first bandwidth; and
the computer readable medium or media further stores machine readable instructions that, when executed by the one or more processors, cause the one or more processors to generate the IE to include an indication of whether multiple spatial streams are allowed in the wireless communication network when using the second primary channel in the second mode of operation.

18. The tangible, non-transitory computer readable medium, or media, of claim 13, further storing machine readable instructions that, when executed by the one or more processors, cause the one or more processors to generate the IE to include an indication of an operating class from a plurality of operating classes corresponding to respective frequency bands.

* * * * *